United States Patent
Kearby

[15] 3,644,220
[45] Feb. 22, 1972

[54] METAL HALIDE CONTAINING ZEOLITES AND METHOD FOR THEIR PREPARATION

[72] Inventor: Kenneth K. Kearby, Watchung, N.J.
[73] Assignee: Esso Research and Engineering Company
[22] Filed: Nov. 13, 1969
[21] Appl. No.: 871,627

Related U.S. Application Data

[60] Continuation of Ser. No. 672,690, filed Oct. 4, 1967, abandoned.
[52] U.S. Cl. .................................. 252/442, 252/455 Z
[51] Int. Cl. .................................. B01j 11/78, B01j 11/40
[58] Field of Search ............................ 252/442, 455 Z

[56] References Cited

UNITED STATES PATENTS

| 3,296,331 | 1/1967 | Korvach | 252/442 X |
| 3,318,802 | 5/1967 | Martin | 252/455 X |
| 3,354,078 | 11/1967 | Miale et al. | 252/455 X |
| 3,403,108 | 9/1968 | Leftin et al. | 252/455 X |
| 3,477,965 | 11/1969 | Fishel | 252/442 |

*Primary Examiner*—Daniel E. Wyman
*Assistant Examiner*—C. F. Dees
*Attorney*—Pearlman and Stahl and George M. Gould

[57] ABSTRACT

This disclosure relates to novel metal halide containing zeolites, particularly crystalline aluminosilicate zeolites and methods for their preparation. Such materials are prepared by treating alkali or alkaline earth forms of crystalline aluminosilicate zeolites with a volatile halide of a less positive metal or nonmetal than the alkali or alkaline earth metals under relatively anhydrous conditions. The resulting products may be used as formed or may be washed free of soluble halides prior to use. Utility for these materials is to be found as adsorbents, particularly selective adsorbents and as catalysts for acid-catalyzed reactions such as catalytic cracking, alkylation, polymerization, isomerization and other carbonium ion type reactions.

24 Claims, No Drawings

METAL HALIDE CONTAINING ZEOLITES AND METHOD FOR THEIR PREPARATION

BACKGROUND OF THE INVENTION

It has now been well established in the art that the properties of crystalline aluminosilicate zeolites can be altered by treating them with various metal or nonmetal compounds. For example, in U.S. Pat. Nos. 2,971,903 and 2,971,904 the activity and selectivity of crystalline aluminosilicate zeolite hydrocarbon conversion catalysts can be improved by treating such materials with aqueous solutions of the alkaline earth metals, platinum group metals or the iron group metals. In the U.S. Pat. No. 2,971,904 in particular the crystalline aluminosilicate zeolites serve as supports for metal compounds which of themselves have substantial catalytic activity. Additionally, it has been found that the size of the uniform pores of a crystalline aluminosilicate zeolite can be altered by replacing some of the cations in the window positions in the zeolite with another metal cation having a different ionic radius thereby either increasing or decreasing the effective diameter of the openings. Such a technique is described in U.S. Pat. No. 3,282,028. As in the previous examples, the metal interchange with the zeolite is accomplished by placing the zeolite in contact with an aqueous solution of the metal cation to be introduced.

Still another technique for introducing metals into crystalline aluminosilicate zeolites involves an ion exchange step followed by reduction of the metal ion to the metal form inside the inner adsorption regions of the zeolite. Whereas the previous methods presented the metal in either the cationic or a covalent compound form, patentees here teach the use of a dispersed form of the elemental metal.

Yet another technique is taught in U.S. Pat. No. 3,013,990 wherein crystalline aluminosilicate zeolites are ion exchanged with a complex cation form of a metal. The exchanged form of the zeolite is then heated at elevated temperatures to decompose the complex and yield the elemental form of the metal in the inner adsorption region of the zeolite. This technique is limited to relatively wide pore crystalline aluminosilicate zeolites since the complex metal cations cannot pass through small pore zeolitic materials. Once again, the catalytically active form of the metal in the zeolite is the elemental form.

U.S. Pat. No. 3,013,987 discloses yet another technique for metal loading of crystalline aluminosilicate zeolites. This technique involves treating the zeolites with decomposable fluid metal compounds. The metals used include those of groups I-B, II-A, III-A, IV-A, IV-B, VI-B, VII-B and VIII of the Periodic Table (Handbook of Chemistry and Physics, 31st Ed., p. 336, Chemical Rubber Publishing Company, 1949). The reducible compounds of these metals include the carbonyls, carbonyl hydrides, acetyl acetonate complexes of the metals in the zero valence state, reducible halides, metal alkyls and other metal-organic compounds such as cyclopentadienyl metal compounds and ethylenic complex compounds of the noble metals. As in the previous cases, the decomposable metal compounds are converted to the elemental metal form in the inner adsorption regions of the zeolite by either heat treatment or by treatment with a reducing agent. The reference further teaches that best results are obtainable when much of the water of crystallization of the zeolite is removed prior to treating with the decomposable fluid metal compound.

SUMMARY OF THE INVENTION

The present invention is concerned with a new class of metal containing crystalline aluminosilicate zeolites which are useful as adsorbents and as catalysts particularly in petroleum hydrocarbon conversion processes. The novel crystalline aluminosilicate zeolites of the present invention are obtained by reacting an alkali or alkaline earth or hydrogen form of the aluminosilicate zeolite with the volatile halide of a less positive metal or nonmetal than the alkali or alkaline earth metals which are present in the cation exchange sites of the zeolite. In order to obtain best results in the foregoing reactions, it is desirable that the crystalline aluminosilicate be dried by treating the material at elevated temperatures, e.g., in the range between 400° to 1,200° F. for a sufficient time so as to remove substantially all of the adsorbed water contained in the zeolitic pores. It is further desirable to conduct the reaction between the volatile halide and the metal or hydrogen containing crystalline aluminosilicate zeolite under relatively anhydrous conditions. Since the anhydrous metal halide will react with water to form the metal oxide, any water present requires that additional metal halide be used. Preferably, the water content should not be over 0.1 percent of the weight of the zeolite. The resulting product may be used as formed or may be washed free of soluble halides depending on its intended use.

The crystalline aluminosilicate zeolites useful in the present invention are now well known in the adsorption and catalytic arts and many forms of such zeolites are now staples of commerce. Among the preferred aluminosilicates one can include Zeolites A, faujasite (both the natural form and the synthetic form marketed as Zeolite Y by the Linde Division of Union Carbide), L, D, R, S, T, Z, E, F, Q, B, X, levynite, dachiarite, erionite, analcite, paulingnite, noselite, phillipsite, brewsterite, flakite, datolite, chabazite, gmelinite, lucite, scapolite, mordenite, ZK-4, Zeolite alpha and ZK-5. In their hydrated form the aluminosilicates may be represented by the formula:

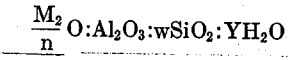

wherein M represents at least one cation which balances the electrovalence of the alumina tetrahedra, $n$ represents the valence of the cation, $w$ the moles of $SiO_2$ and Y the moles of $H_2O$. The cation can be one or more of a number of metal ions depending upon whether the aluminosilicate is synthesized or occurs naturally. The particularly preferred aluminosilicates are those having uniform pore diameters of at least about 4A. It is further preferred to utilize those crystalline aluminosilicate zeolites having silica to alumina mole ratios greater than about 3. Included in this group are synthetic faujasite, erionite and mordenite.

The volatile halides used to form the novel adsorbents and catalysts of the present invention include the volatile halides of metal elements such as aluminum, zirconium, titanium, tin, molybdenum, tungsten, chromium, vanadium, antimony, bismuth, iron, platinum, palladium and the rare earths. It is further within the scope of the present invention to utilize halides of nonmetals to introduce such materials into crystalline aluminosilicate zeolites in catalytically active forms. For example, the halides and oxy halides of arsenic, silica, boron or phosphorus, may be utilized to introduce these elements into the zeolitic structure. Specific examples of preferred nonmetallic compounds for this purpose include $AsCl_3$, $SiCl_4$, $SiOCl_2$, $BCl_3$ and $PCl_5$.

It is also possible to utilize the less volatile metal halides of metals such as copper and zinc. The halides of copper and zinc are believed to react by surface diffusion with the zeolitic material rather than by a mechanism of volatilization of the halide. Bromides, iodides and some fluorides of many metals are sufficiently volatile to be used, but chlorides are usually preferred because of their lower cost.

It is believed that the metal or nonmetal halides react with either the alkali metal or hydrogen form of the zeolites as per the following equations which utilize aluminum chloride as the treating agent for the purposes of example only

[Zeolite] M + AlCl₃ → [Zeolite] AlCl₂ + MCl
   or [Zeolite]₂ AlCl + 2MCl
   or [Zeolite]₃ Al + 3MCl where $M = Na^+, K^+, H^+$, etc.

Suitable changes in the above representation would be obvious if M were a polyvalent cation such as $Mg^{++}$ or $Ca^+$.

It is evident, of course, that the extent of substitution on the metal halide or nonmetal halide atom will be limited by the valence state of such atom. The above representation, of course, should not be taken as suggesting that several zeolite crystal structures are ionically bonded to one metal atom, e.g., aluminum, but rather that the polyvalent aluminum atom may be satisfying the ionic charges on several sides of the zeolitic crystal lattice.

It is desired that in effecting the metal or nonmetal halide treatment of the crystalline aluminosilicate zeolites of the present invention that from 0.1 to 3 stoichiometric equivalents of halide ion be used per equivalent of exchangeable hydrogen, alkali or alkaline earth metal in the zeolite. More preferably, it is desirable to utilize from 0.5 to 1.5 equivalents of metal or nonmetal halide per equivalent of alkali metal or hydrogen ion in the zeolite. In cases where the metal or nonmetal halide has intrinsic catalytic activity such as for example when such materials are Lewis acids, a molar excess of these materials is beneficial. This molar excess results in excess adsorbed metal or nonmetal halide on the surface of the zeolite thereby enhancing the catalytic properties of the resulting catalyst deposit. A particular example of interest would be the utilization of aluminum chloride as the treating agent. An excess of aluminum chloride would result in having aluminum chloride present on the zeolitic surfaces where this material could function in a catalytic process such as in a Friedel-Craft-type reaction. For example, excess $AlCl_3$ on a Pt or Pd containing zeolite will enchance its hydroisomerization and hydrocracking activity.

It is interesting to note that treatment of the crystalline aluminosilicate zeolites with the volatile metal or nonmetal halides in accordance with the present invention results in the uptake of the metal or nonmetal halides in a form which partially resists removal by washing with water. It is thus possible to wash the treated zeolites so as to remove any alkali metal halide or hydrohalide acid which may have been formed during the replacement of the exchangeable cations with the volatile metal or nonmetal halides. It is believed that washing the halide treated products results in the replacement of some of the remaining halogen on the metal or nonmetal attached to the zeolite with acidic OH groups. Such acidic OH groups would be effective as carbonium ion initiators which would make such materials exceptionally useful in carbonium ion reactions such as cracking, disproportionation, isomerization, alkylation, etc. It is further contemplated to utilize such treated zeolites in conjunction with hydrogenation components such as platinum, palladium, nickel, cobalt, molybdenum, tungsten, etc., in processes wherein both a hydrogenation and acidic functional catalyst is required, e.g., hydrocracking, hydroisomerization, hydrodealkylation, etc. For example a hydrogen faujasite containing 0.1 to 1.0 percent of Pt or Pd is treated with 1 to 20 percent $AlCl_3$ or $AlBr_3$ at 400° to 1,000° F. to give active hydroisomerization catalysts.

The powdered form of the zeolite to be treated with metal halide is preferably calcined at about 800° to 1,000° F. to remove most of its contained water. It is then thoroughly mixed with powdered metal halide under anhydrous conditions. The mixture is preferably stirred or tumbled while being heated. This disperses the metal halide and reacts it with the zeolite. The calcination temperature is preferably about 500° to 1,000° F. for one-half to about 5 hours. Alternatively, the vaporized metal halide may be passed through a bed of the powdered or granular zeolite. This procedure is preferred with low boiling liquid halides such as $SiCl_4$, $TiCl_4$, $AsCl_3$, etc. These treatments may be at atmospheric, subatmospheric or at elevated pressures up to 1,000 p.s.i.g.

A DESCRIPTION OF THE PREFERRED EMBODIMENTS

The specific embodiments of the present invention may be more clearly understood by reference to the following examples.

EXAMPLE 1

This example demonstrates the preparation of an aluminum chloride treated sodium faujasite crystalline aluminosilicate zeolite.

A quantity of synthetic faujasite in the sodium form obtained from the Linde Division of Union Carbide and designated by them as Linde 13–Y type molecular sieve was calcined for 15 hours at 1,000° F. to reduce its 20 percent water content below 0.1 percent. Portions of this dried material were then treated with increasing amounts of aluminum chloride vapors. The treated crystalline aluminosilicate zeolite was then heated for 16 hours at 450°–1,000° F. under a dry nitrogen atmosphere. It was observed that no significant amount of aluminum chloride volatilized out of the leaner mixtures, even when they were heated up to 1,000° F. (aluminum chloride sublimes at 361° F.). It was further noted that no hydrogen chloride was evolved during the reaction of the sodium form of the zeolite with the aluminum chloride. Portions of these products were washed with water or dilute ammonium hydroxide and then dried and recalcined at 800° F.

X-ray diffraction patterns showed little loss of structure for samples treated at 1,000° F. with 0.17 grams of aluminum chloride per gram of faujasite. Although the 8.7 and 7.5 A lines were weaker, the 5.7 and 4.8A lines were stronger. It was further observed that the larger spacings tend to be restored when water is restored to the zeolite by washing. The 0.17 g. of aluminum chloride per gram of faujasite is about the amount required for the chlorine to be equivalent to the sodium content of the faujasite. When larger amounts of aluminum chloride, e.g., 0.39 and 0.76 grams per gram of faujasite, were used, the intensities of the faujasite diffraction lines were decreased considerably. The results of the X-ray examination of treated and untreated sodium faujasite are summarized in Table I below.

TABLE I

| Treatment of Na Faujasite | | with $AlCl_3$ | | |
|---|---|---|---|---|
| g. $AlCl_3$/g. NaY | 0 | 0.17 | 0.39 | 0.76 |
| Calcination Temp. | — | 1,000 | 500 | 500 |
| X-ray Diffr. Lines | Intensities of Dif | fraction Lines | | |
| 14.3 A. | >78 | >71 | 16 | 8 |
| 8.7 | 74 | 34 | 22 | 19 |
| 7.5 | 57 | 35 | 22 | 11 |
| 5.7 | 77 | >88 | 34 | 18 |
| 4.8 | 49 | 60 | 21 | 9 |
| 4.4 | 75 | 66 | 26 | 11 |

Portions of the above aluminum chloride treated products were washed either by stirring them into water or into dilute ammonium hydroxide solution and then washing on a filter, drying and calcining at 800° F. The dilute ammonium hydroxide gave a rapid neutralization of the hydrochloric acid formed by the reaction of the metal chlorides with water and reduced its harmful effect on the zeolite. The ammonia washed samples were observed to result in better faujasite structures than the anhydrous aluminum chloride treated products unwashed. This effect was shown to be greatest for those zeolites which were treated with large amounts of aluminum chloride. The ammonium hydroxide washed products also had lower sodium contents. This furnishes a new procedure for replacing the alkali metal in the zeolite and can be used to incorporate metals which cannot be put into the zeolite by base exchange.

The treat with 0.76 g. of aluminum chloride resulted, after ammonium hydroxide washing, in a product which gave a weaker faujasite pattern than base exchanged ammonium faujasite. This could indicate that the level of treatment was on the severe side. This material still retained a fairly high surface area of 556 square meters/gram.

The 0.65 to 1.2 percent Cl content of the washed products clearly indicates that these materials would have enhanced activity for isomerization, alkylation and other carbonium ion type reactions. The results obtained on the examination of the ammonium hydroxide and water washed faujasites are summarized below in Table II.

TABLE II

[Na faujasite treated with AlCl₃ vapor and then washed]

| Grams AlCl₃/g. NaY | 0 | 0.19 | 0.39 | | 0.76 | |
|---|---|---|---|---|---|---|
| Washing | Calcn. NH₄Y | H₂O | NH₄OH | NH₄OH | H₂O | None |
| X-ray diffr. lines | | Intensities of diffr. lines | | | | |
| ¹14.3 | 70 | 74 | 76 | 75 | 16 | 8 |
| ¹8.7 | 54 | 50 | 39 | 26 | | 19 |
| ¹7.5 | 29 | 39 | 31 | 21 | | 11 |
| ¹5.7 | 76 | 78 | 75 | 45 | 11 | 18 |
| ¹4.8 | 60 | 53 | 46 | 25 | | 9 |
| ¹4.4 | 72 | 59 | 58 | 31 | 10 | 11 |
| | NaY | | | | | |
| Percent Na | 10.0 | 2.5 | 3.1 | 2.64 | 1.7 | 0.71 |
| Percent Cl | 0.0 | | 0.65 | 1.2 | 0.96 | 0.5 |
| Percent Al | 12 | | | 15.4 | 19.6 | 15.7 |
| Surface area, M²/g | 840 | | | 690 | 556 | 239 |

¹ Angstroms.

EXAMPLE 2

This example describes the preparation of a zirconium chloride treated zeolite.

The procedure used in Example 1 for treating Linde 13–Y sodium faujasite with a volatile metal halide was repeated utilizing 0.25 g. of $ZrCl_4$ per gram of faujasite. The chloride was stoichiometrically equivalent to the sodium in the faujasite. A portion of the zirconium chloride treated sieve was then washed with dilute ammonium hydroxide solution as above. The X-ray diffraction data on samples of unwashed and washed zirconium chloride treated faujasite were obtained. It was observed that treating sodium faujasite with zirconium chloride caused a large decrease in the intensity of the 7.5 to 14.3 A spacings, but a smaller decrease in the 4.4 to 5.7 A spacings. Some decrease in these spacings would be expected in all cases due to the dilution of the faujasite by the metal chloride and possibly due also to the relatively greater X-ray adsorption by chlorine and zirconium atoms. The results of the X-ray diffraction test are summarized in Table III.

TABLE III

| | Treatment of Na Faujasite with $ZrCl_4$* | |
|---|---|---|
| X-ray diffr. Lines | Unwashed | NH₄OH Washed |
| 14.3 A | 23 | >69 |
| 8.7 | 8 | 24 |
| 7.5 | 18 | 21 |
| 5.7 | 57 | 59 |
| 4.8 | 30 | 31 |
| 4.4 | 43 | 47 |
| % Cl | — | 1.3 |
| S Area, m.²/g. | — | 650 |

*16 hours treat at 700° F. of 0.25 g. $ZrCl_4$/g. faujasite with occasional mixing

EXAMPLE 3

This Example demonstrates the treatment of a hydrogen form of faujasite with volatile aluminum chloride.

The procedure employed in Example 1 was repeated utilizing an ammonium exchanged faujasite which had been calcined at 800° F. to convert it to the acid or hydrogen form. Heating of the aluminum chloride treated hydrogen faujasite resulted in the evolution of hydrogen chloride gas which indicated that a reaction was occurring with the residual OH groups on the faujasite. The X-ray diffraction patterns of the anhydrous unwashed aluminum chloride treated sample showed some loss of structure. However, the ammonium hydroxide washed samples showed good faujasite structures indicating little loss from the treatment. The resulting aluminum chloride treated hydrogen faujasites would have higher acidity than the calcined ammonium faujasite starting material. This would indicate a higher level of catalytic activity for acid catalyzed reactions. The results of the above preparation are summarized in the following Table IV.

TABLE IV

Treatment of Calcined Ammonium Faujasite with $AlCl_3$ at 0.19 g. $AlCl_3$/g. HY

| Washing Diffr. Lines | Calcined NH₄Y (800° F.) | $AlCl_3$ Treated None | Calcined NH₄Y NH₄OH |
|---|---|---|---|
| | Intensity of X-ray Diffr. Lines | | |
| 14.3 A | >70 | 30 | >78 |
| 8.7 | 54 | 29 | 38 |
| 7.5 | 29 | 21 | 30 |
| 5.7 | >76 | 52 | 66 |
| 4.8 | 60 | 25 | 37 |
| 4.4 | 72 | 30 | 48 |

EXAMPLE 4

This example demonstrates the treatment of a hydrogen form faujasite with zirconium chloride utilizing the procedure of Example 1. As in Example 3 the hydrogen faujasite was prepared by calcining an ammonium exchanged faujasite at 800° F. As in the previous example, it was observed that hydrogen chloride was evolved when the hydrogen faujasite treated with zirconium chloride was heated.

The zirconium chloride treated hydrogen faujasite was divided into two portions, one of which was washed with water and the other with dilute ammonium hydroxide solution. The water washed zirconium chloride sample showed some loss of structure. However, the ammonium hydroxide washed sample showed good faujasite structure which indicated little loss for the treatment. The washed zirconium chloride treated products contained surface areas of 634 and 695 m.²/g. and contained 0.97 and 0.75 percent chlorine, respectively. These samples further were observed to have very low sodium contents. The foregoing clearly indicates the utility of these zirconium chloride treated hydrogen faujasite samples as catalysts in acid catalyzed reactions. The results of the examination of zirconium chloride treated hydrogen faujasite are summarized in Table V.

TABLE V

Treatment of Calcined Ammonium faujasite With $ZrCl_4$ at 0.25 g. $ZrCl_4$/g. HY

| Diffr. Lines | Calcined $NH_4Y$ (800° F.) | $ZrCl_4$ Treated $H_2O$ Washed | Calcined $NH_4Y$ $NH_4OH$ Washed |
|---|---|---|---|
| 14.3 A | >70 | >72 | >72 |
| 8.7 | 54 | 21 | 50 |
| 7.5 | 29 | 22 | 36 |
| 5.7 | >76 | 45 | >72 |
| 4.8 | 60 | 27 | 38 |
| 4.4 | 72 | 27 | 52 |
| % Na | 2.5 | 0.45 | 1.38 |
| % Cl | — | 0.97 | 0.75 |
| SA m.²/g. | 840* | 634 | 695 |

*For NaY calcined at 1,000° F.

EXAMPLE 5

This example demonstrates the effect of a calcination step subsequent to the volatile metal halide treatment of the sodium form of faujasite.

A sodium form of faujasite was mixed with aluminum chloride so as to give a ratio of 0.17 g./g. of sodium faujasite. The mixture was then calcined at 1,000° F. for a period of 3 hours. The calcined faujasite was then washed with water. This product was compared with samples of sodium faujasite which were treated at room temperature with solutions of ammonium chloride or dilute hydrochloric acid which contained the same amount of chloride. The products were then washed.

It was observed that calcination with aluminum chloride appeared to make the chlorine more difficult to remove by water washing, but little effect on the degree of removal of sodium was observed. The aluminum chloride sodium faujasite which had been calcined was observed to have a higher residual chlorine content after washing than any of the other samples tested. Washing with ammonium chloride was not observed to be as effective in removing sodium as was the calcination with aluminum chloride and washing procedure. Dilute hydrochloric acid was an effective reagent for the removal of sodium. However, the use of this reagent caused a greater loss of faujasite structure than was observed for the aluminum chloride treat followed by calcination and ammonium hydroxide washing. The results of the foregoing experiments are summarized below in Table VI.

TABLE VI

[Sodium removal from faujasite calcined at 1,000° F.]

| Reagent | 0.19 g. $AlCl_3$*/g. Na faujasite | | $NH_4Cl$* | $HCl$* |
|---|---|---|---|---|
| Calcin.** | None | 1,000° F. | None | None |
| Washing | $H_2O$ | $H_2O$ | $NH_4OH$ | $H_2O$ | $H_2O$ |
| Percent Na | 2.83 | 3.11 | 4.02 | 4.31 | 2.84 |
| Percent Cl | 0.15 | 0.65 | 0.13 | 0.05 | 0.10 |
| X-ray diffr. lines | | | | | |
| 14.3 A | | >74 | | | >75 |
| 8.7 | | 50 | | | 16 |
| 7.4 | | 39 | | | 14 |
| 5.7 | | >78 | | | 45 |
| 4.8 | | 53 | | | 22 |

* Cl equivalent to Na in faujasite.
** After adding halogen containing reagent.

EXAMPLE 6

This example demonstrates the treatment of sodium faujasite with a volatile halide of iron. Calcined sodium faujasite was treated with anhydrous ferric chloride at 700° F. in an amount of 0.25 g. of ferric chloride per gram of sodium Y. The ferric chloride appeared to disperse well on the zeolite giving a uniform yellow product. Samples of the ferric chloride treated product which were washed with water or dilute ammonium hydroxide retained about 20 percent Fe. The same iron content was retained when the same sodium faujasite was mixed with ferric chloride and washed without being calcined. The inspection of the ferric chloride treated sodium faujasite is given below in Table VII.

TABLE VII

| Treatment of Na Faujasite with $FeCl_3$,* at 0.25 g. $FeCl_3$/g. | | |
|---|---|---|
| Na Faujasite Calcination Temp. ° F. | 700 | None |
| Washed | $H_2O$ | $NH_4OH$ | $H_2O$ |
| % Fe | 20.5 | 19.1 | 20.4 |

*About 1 Cl per Na in faujasite

EXAMPLE 7

This example demonstrates the treatment of a hydrogen faujasite with a titanium halide. The hydrogen faujasite was prepared by calcining ammonium faujasite at 800° F. The halide form of titanium was titanium trichloride. The amount of titanium chloride was 0.22 g. of titanium chloride per gram of hydrogen faujasite (about one Cl per original Na in the faujasite). The resulting titanium chloride treated hydrogen faujasite was calcined at 600° F. to produce a catalytically active form of this material. An active polymerization catalyst can be made by treating this product with a metal alkyl or hydride, i.e., $AlR_3$, $AlH_3$, etc. Such treatments may also be used on zeolites which have been reacted with $VCl_3$, $FeCl_3$, $CrCl_3$, $NiCl_2$, etc.

EXAMPLE 8

This example demonstrates the preparation of a silicon halide treated hydrogen faujasite. The hydrogen faujasite was prepared in the same manner as that indicated for Example 7. The halogen form of silicon utilized in this example was silicon tetrachloride. A total of 0.26 g. of silicon tetrachloride per gram of hydrogen Y was vaporized in a stream of nitrogen and passed into the previously calcined zeolite at 400° F. over a period of 1.5 hours. A sample of this silicon tetrachloride treated hydrogen faujasite had a chlorine content of 8.8 percent on analysis. A sample of the product was washed with dilute ammonium hydroxide to yield a superior adsorbent or catalytic material.

What is claimed is:

1. A method for treating crystalline aluminosilicate zeolites while substantially maintaining their crystallinity which method comprises reacting a crystalline aluminosilicate zeolite having exchangeable cations consisting essentially of cations selected from the group consisting of alkali metals and alkaline earth metals with a volatile halide compound of an element less positive than the alkalis and alkaline earths whereby said halide compound is introduced into said zeolite under anhydrous conditions.

2. The method of claim 1 wherein said volatile halide is selected from the group of metal halides consisting of the halides of aluminum, zirconium, titanium, tin, molybdenum, tungsten, chromium, vanadium, antimony, bismuth, iron, platinum group metals and the rare earths.

3. The method of claim 1 wherein said halides are selected from the group of nonmetal halides consisting of the halides of arsenic, silicon, boron and phosphorus.

4. The method of claim 1 wherein the halide treated crystalline aluminosilicate zeolite is calcined at elevated temperatures.

5. The method of claim 1 wherein the volatile halide contains 0.1 to 3.0 atoms of halogen per atom of exchangeable cation in the zeolite.

6. The method of claim 1 wherein said volatile halide treated zeolite is subsequently washed to remove soluble halides.

7. The method of claim 6 wherein said washing comprises the use of dilute ammonium hydroxide solution.

8. The method of claim 2 wherein the said volatile halide comprises aluminum chloride.

9. The method of claim 2 wherein said volatile halide comprises zirconium chloride.

10. The method of claim 2 wherein said volatile halide comprises ferric chloride.

11. The method of claim 2 wherein said volatile halide comprises platinum chloride.

12. The method of claim 2 wherein said volatile halide comprises palladium chloride.

13. The method of claim 2 wherein said volatile halide comprises titanium chloride.

14. The method of claim 3 wherein said volatile halide comprises silicon tetrachloride.

15. The method of claim 1 wherein said volatile halide is reacted with said crystalline aluminosilicate zeolite at a temperature in the range from about 400° to 1,200° F.

16. The method of claim 1 wherein said crystalline aluminosilicate zeolite is dried prior to said reaction with the volatile halide.

17. An improved crystalline aluminosilicate zeolite composition prepared by the method of claim 1.

18. A composition of matter comprising a crystalline aluminosilicate zeolite, said composition being prepared by reacting a crystalline aluminosilicate zeolite having exchangeable cations consisting essentially of cations selected from the group consisting of alkali metal and alkaline earth metal cations with aluminum chloride vapors in an amount sufficient to yield a ratio of 0.5 to 1.5 equivalents of aluminum chloride per equivalent of cation in said zeolite, while maintaining the crystallinity of said zeolite.

19. The composition of claim 18 wherein said aluminum chloride treated crystalline aluminosilicate zeolite is calcined and then washed to remove soluble halides.

20. The composition of claim 18 wherein said crystalline aluminosilicate contains a metal hydrogenation component prior to being contacted with aluminum chloride vapors.

21. The composition of claim 20 wherein said metal hydrogenation component comprises a platinum group metal.

22. In a method for treating crystalline aluminosilicate zeolites while maintaining their crystallinity by reacting a crystalline aluminosilicate zeolite having exchangeable cations consisting essentially of cations selected from the group consisting of alkali metals and alkaline earth metals, with a volatile halide compound of an element less positive than the alkali metals and alkaline earth metals whereby said halide compound is introduced into said zeolite under anhydrous conditions, the improvement comprising subsequently washing the said volatile halide treated zeolite to remove soluble halides.

23. A composition of matter comprising a crystalline aluminosilicate zeolite, said composition being prepared by reacting a crystalline aluminosilicate zeolite having exchangeable cations consisting essentially of cations selected from the group consisting of alkali metal and alkaline earth metal cations with aluminum chloride vapors in an amount sufficient to yield a ratio of 0.5 to 1.5 equivalents of aluminum chloride per equivalent of cation in said zeolite, while maintaining the crystallinity of said zeolite, and calcining and washing said aluminum chloride treated crystalline aluminosilicate zeolite to remove soluble halides.

24. The method of claim 22 wherein said washing comprises the use of dilute ammonium hydroxide solution.

* * * * *